(12) United States Patent
Etoh et al.

(10) Patent No.: US 8,351,154 B2
(45) Date of Patent: Jan. 8, 2013

(54) PERPENDICULAR RECORDING MAGNETIC HEAD WITH A VARYING INTERVAL BETWEEN THE MAIN POLE AND THE SHIELD, AND METHODS OF MANUFACTURING THEREOF

(75) Inventors: Kimitoshi Etoh, Kanagawa (JP); Mikito Sugiyama, Kanagawa (JP); Isao Nunokawa, Kanagawa (JP); Tomohiro Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 426 days.

(21) Appl. No.: 12/636,659

(22) Filed: Dec. 11, 2009

(65) Prior Publication Data

US 2010/0157484 A1  Jun. 24, 2010

(30) Foreign Application Priority Data

Dec. 19, 2008  (JP) .................................. 2008-323058

(51) Int. Cl.
*G11B 5/127* (2006.01)
(52) U.S. Cl. ......... 360/125.07; 360/125.06; 360/125.08; 360/125.1; 360/125.14; 360/125.3
(58) Field of Classification Search ............. 360/125.03, 360/125.06, 125.08, 125.1, 125.11, 125.12, 360/125.14, 125.15, 125.3, 123.05, 125.07
See application file for complete search history.

(56) References Cited

U.S. PATENT DOCUMENTS

| 7,889,456 | B2* | 2/2011 | Jiang et al. | 360/125.08 |
| 7,995,307 | B2* | 8/2011 | Zheng | 360/125.13 |
| 8,085,498 | B2* | 12/2011 | Bai et al. | 360/125.03 |
| 8,107,193 | B2* | 1/2012 | Nunokawa et al. | 360/125.08 |
| 2004/0061988 | A1 | 4/2004 | Matono et al. | 360/327 |
| 2006/0291096 | A1* | 12/2006 | Sasaki et al. | 360/126 |
| 2007/0014049 | A1* | 1/2007 | Yazawa | 360/126 |
| 2007/0019327 | A1 | 1/2007 | Maruyama et al. | |
| 2007/0188921 | A1 | 8/2007 | Mochizuki et al. | 360/126 |
| 2007/0217069 | A1 | 9/2007 | Okada et al. | |
| 2008/0117546 | A1* | 5/2008 | Le et al. | 360/125.03 |
| 2009/0279207 | A1* | 11/2009 | Sasaki et al. | 360/125.03 |
| 2010/0128392 | A1* | 5/2010 | Bonhote et al. | 360/125.03 |

FOREIGN PATENT DOCUMENTS

| CN | 101042873 A | 3/2007 |
| CN | 1941084 A | 4/2007 |

OTHER PUBLICATIONS

Chinese Office Action from application No. 200910253805.6 dated May 6, 2011 (no translation).

* cited by examiner

*Primary Examiner* — Jefferson Evans
(74) *Attorney, Agent, or Firm* — Zilka-Kotab, PC

(57) ABSTRACT

A perpendicular recording magnetic head is provided, according to one embodiment, in which even if a thickness of a main pole is reduced corresponding to a reduction in a recording track width, recording performance is not degraded. A magnetic-field auxiliary pole and a nonmagnetic layer are stacked on a main pole, and a nonmagnetic portion is provided on each side face on a flying surface side of the magnetic-field auxiliary pole and the nonmagnetic layer, in one approach. In all regions except for a region near a flying surface, an interval between the main pole and a shield is increased by the nonmagnetic portion and the nonmagnetic layer, so that magnetic field loss is prevented, and consequently magnetic field strength and a magnetic field gradient are increased. Other systems and methods are also disclosed for retaining magnetic recording performance while reducing a thickness of a main pole.

22 Claims, 15 Drawing Sheets

Fig.7
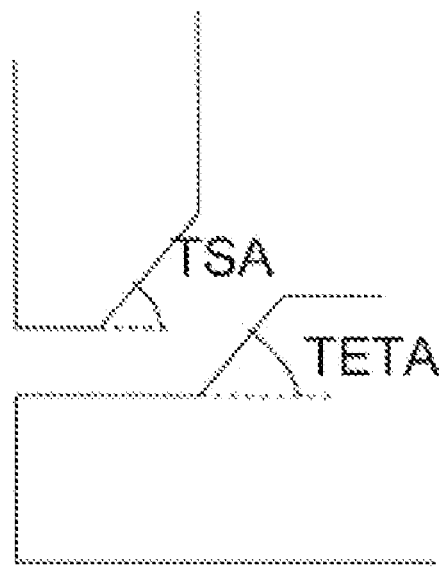
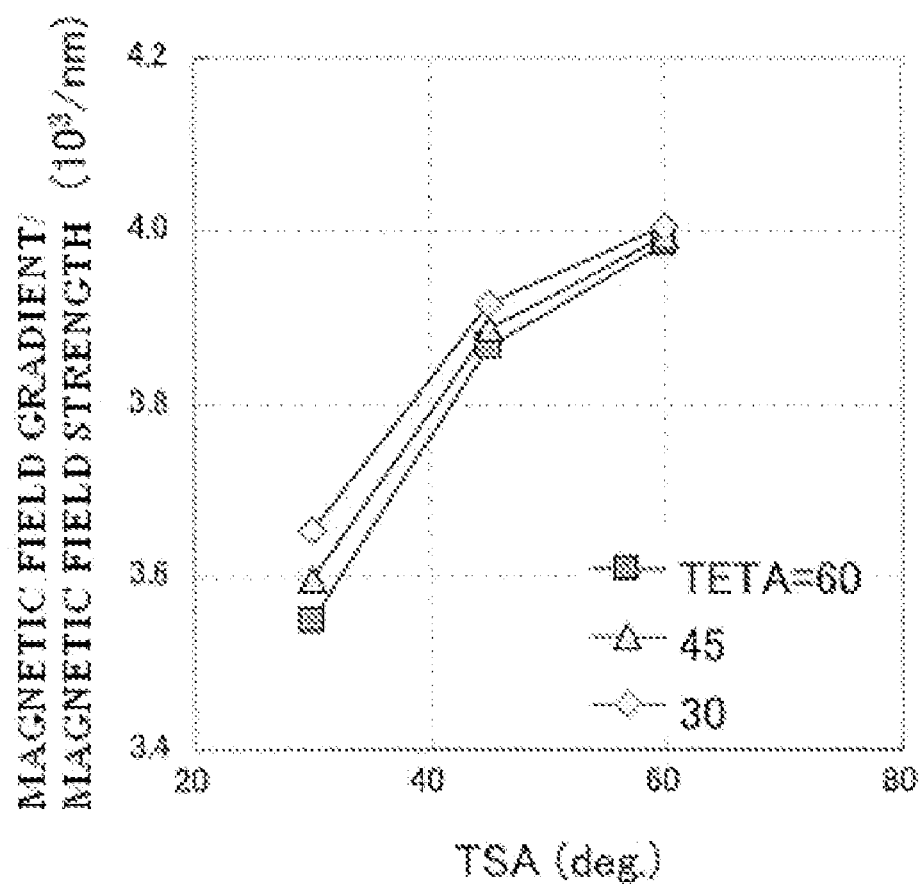

Fig.10
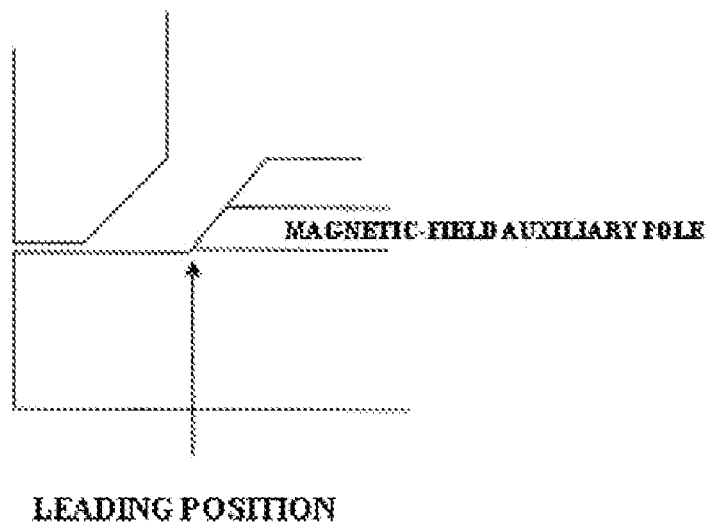
LEADING POSITION
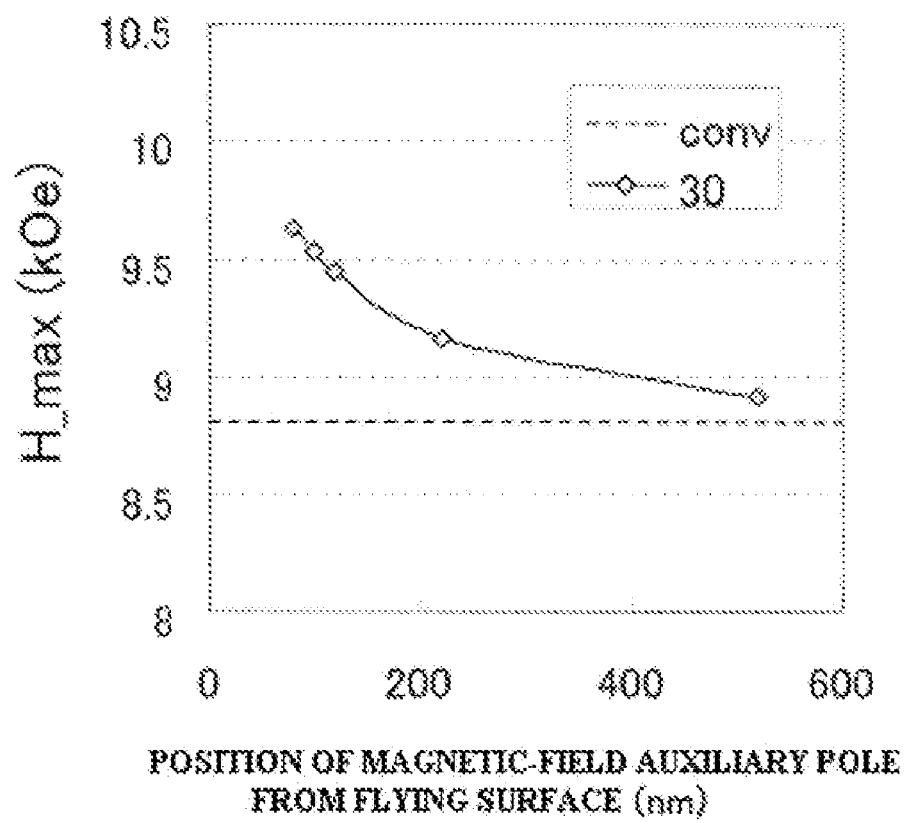
POSITION OF MAGNETIC-FIELD AUXILIARY POLE
FROM FLYING SURFACE (nm)

PERPENDICULAR RECORDING MAGNETIC HEAD WITH A VARYING INTERVAL BETWEEN THE MAIN POLE AND THE SHIELD, AND METHODS OF MANUFACTURING THEREOF

RELATED APPLICATIONS

The present application claims priority to a Japanese Patent Application filed Dec. 19, 2008, under Appl. No. 2008-323058, which is incorporated herein by reference.

FIELD OF THE INVENTION

The present invention relates to magnetic recording/reproducing, and more specifically, to perpendicular magnetic recording/reproducing.

BACKGROUND OF THE INVENTION

As seen in many modern technologies, such as a video recorder which uses a hard disk drive (HDD) to store data, a video game system with an internal HDD for storing game information, a television with a built-in HDD for storing video content, portable HDD's for storing pictures, videos, etc., still images, videos, music, and the like are now stored on a HDD's in many different common devices and the need for storage capacity on these HDD's is rapidly increasing. As image data are increased, surface recording density of a magnetic disk drive also needs to be increased in order to store these larger image files. Currently, in a magnetic head, technology is rapidly shifting from in-plane magnetic recording to perpendicular magnetic recording in order to achieve a high surface recording density of about 100 Gbit/in$^2$ or more. This is because when a current surface recording method is used, thermal fluctuations of magnetization of a medium occurs when a bit length is reduced, leading to difficulties in increasing an in-plane recording density.

On the other hand, in perpendicular magnetic recording, since a medium is magnetized in a direction perpendicular to the medium, the problem of thermal fluctuation can be avoided. Moreover, since a single-pole head is used for recording and a soft under layer is provided in a medium, resulting in a small magnetic loss, recording capability is also improved. This change is also a driving force of the shift to the perpendicular recording magnetic head.

However, recording density should still be improved even for a perpendicular recording magnetic head. A recording track width may be reduced to achieve such an improvement. However, a reduction in recording track width causes a corresponding decrease in a magnetic field generated from a leading portion of a main pole to a magnetic recording medium. On the other hand, a magnetic disk drive performs recording/reproducing over a wide area from the inner circumference to the outer circumference of the magnetic recording medium. Therefore, in the inner circumference and the outer circumference of the magnetic recording medium, a magnetic head performs recording/reproducing with a skew angle of about 0° to 15° with respect to a tangent in a rotational direction of the medium.

In such recording/reproducing, if a flying surface of a main pole has a rectangular shape, an adjacent track may be erased, which is problematic since data may be stored on the adjacent track and would be lost in such a situation. To prevent this, a main pole is used for current HDD's, which has a shape such that a track width on a leading side of the main pole is narrow compared with a width on a trailing side thereof so as to meet the narrow track width. Coincidentally, the main pole has an inverted trapezoidal shape when viewed from an air bearing surface. To increase surface recoding density, a recording track width is reduced while a track portion of the main pole, which defines a recording track width, is maintained with the inverted trapezoidal shape adjusted to the skew angle. As a measure for achieving this shape, a thickness of the main pole is reduced in accordance with the reduced track width.

On the other hand, a reduction in a thickness of a main pole film causes degradation in recording performance such as a decrease in magnetic field strength and a reduction in magnetic field gradient, leading to a larger problem. In the light of these problems associated with conventional perpendicular magnetic recording heads, it would be beneficial to have a perpendicular recording magnetic head in which even if a thickness of a main pole is reduced with a corresponding reduction in a recording track width, recording performance is not degraded.

SUMMARY OF THE INVENTION

According to one embodiment, a perpendicular recording magnetic head includes a main pole, comprising a track portion that defines a recording track width and a flare portion that is formed integrally with the track portion and gradually increases in width in an element height direction. A magnetic-field auxiliary pole and a nonmagnetic layer are stacked on the flare portion, and a nonmagnetic portion is formed on each side face of the magnetic-field auxiliary pole and the nonmagnetic layer. The magnetic head also includes an auxiliary pole and a shield provided on a trailing side and each cross track side of the main pole. In addition, an interval between the main pole and the shield provided on the trailing side is larger at a position from which the nonmagnetic layer is provided than at a position of a flying surface.

In another embodiment, a magnetic disk drive includes a magnetic recording medium, a medium drive section that drives the magnetic recording medium, a magnetic head having a recording head and a reproducing head, the recording head being a perpendicular recording magnetic head. The perpendicular recording magnetic head includes a main pole having a track portion that defines a recording track width and a flare portion that is formed integrally with the track portion and gradually increases in width in an element height direction. A magnetic-field auxiliary pole and a nonmagnetic layer are stacked on the flare portion, and a nonmagnetic portion is formed on each side face of the magnetic-field auxiliary pole and the nonmagnetic layer. The magnetic head also includes a shield provided on a trailing side and on each cross track side of the main pole and an auxiliary pole. The magnetic disk drive also includes a head drive section that positions the magnetic head above the magnetic recording medium and a control unit coupled to the head drive section for controlling operation of the head drive section. In addition, an interval between the main pole and the shield provided on the trailing side is larger at a position from which the nonmagnetic layer is provided than at a position of a flying surface.

In another embodiment, a method of manufacturing a perpendicular recording magnetic head includes processing a magnetic-field auxiliary pole and a nonmagnetic layer which are arranged in a stacked orientation on a flare portion of a main pole, forming a nonmagnetic portion on each side face of the magnetic-field auxiliary pole and the nonmagnetic layer, processing the main pole which has a track portion that defines a recording track width, wherein the flare portion is formed integrally with the track portion and gradually increases in width in an element height direction, and forming a shield on a trailing side and each cross track side of the main pole. An interval between the main pole and the shield provided on the trailing side is larger at a position from which the nonmagnetic layer is provided than at a position of a flying surface.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 7 is a diagram showing a relationship between an angle TSA of a rear end portion of the wrap around shield, a taper angle TETA of an end portion on a flying surface side of a stacked film of a magnetic-field auxiliary pole and a nonmagnetic layer, and a magnetic field gradient, according to one embodiment.

FIG. 10 is a diagram showing a relationship between a position of the magnetic-field auxiliary pole and magnetic field strength, according to one embodiment.

DETAILED DESCRIPTION

Figure 1:
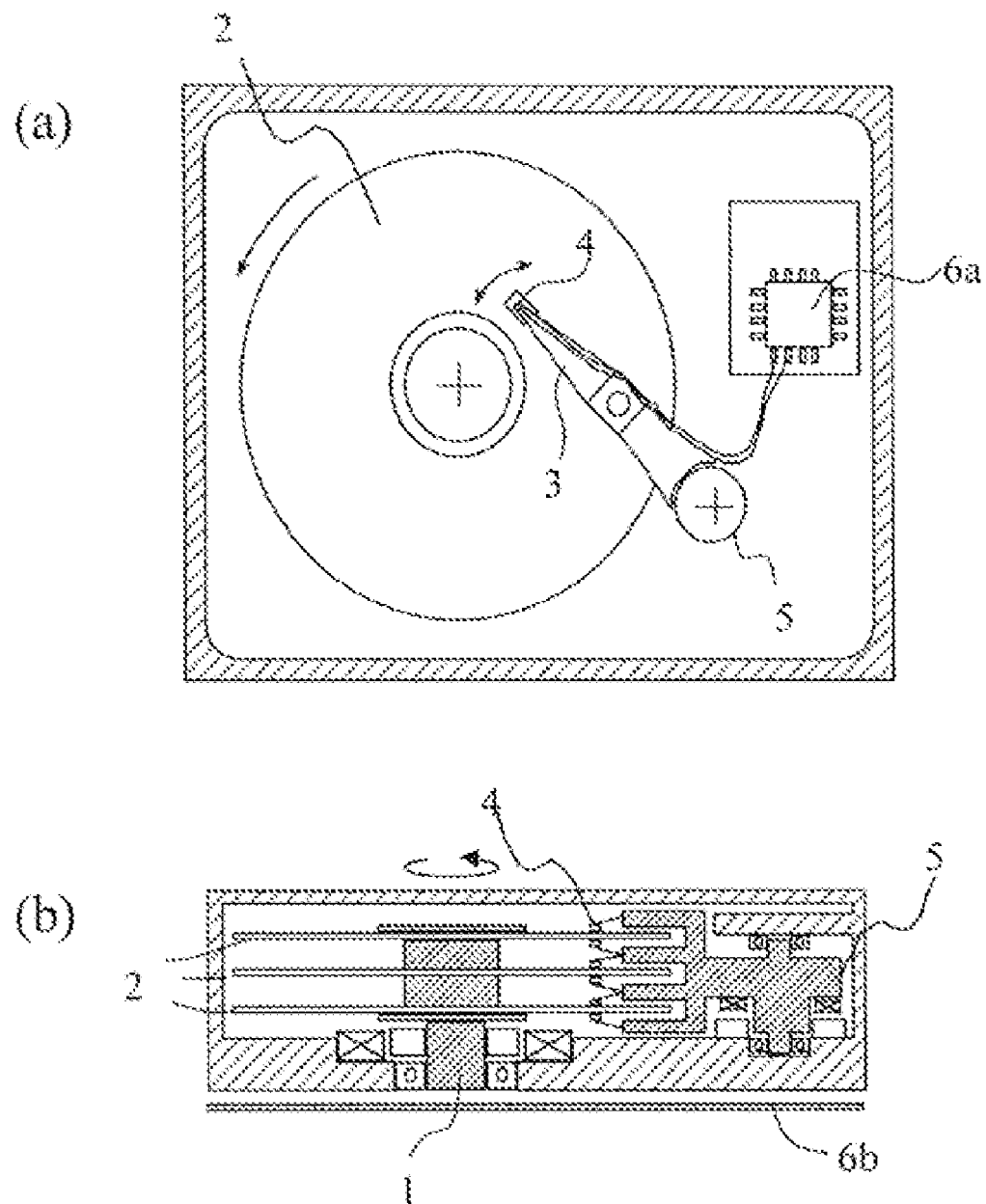
FIG. 1 is a conceptual diagram of a magnetic disk drive, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one general embodiment, a perpendicular recording magnetic head includes a main pole, comprising a track portion that defines a recording track width and a flare portion that is formed integrally with the track portion and gradually increases in width in an element height direction. A magnetic-field auxiliary pole and a nonmagnetic layer are stacked on the flare portion, and a nonmagnetic portion is formed on each side face of the magnetic-field auxiliary pole and the nonmagnetic layer. The magnetic head also includes an auxiliary pole and a shield provided on a trailing side and each cross track side of the main pole. In addition, an interval between the main pole and the shield provided on the trailing side is larger at a position from which the nonmagnetic layer is provided than at a position of a flying surface.

In another general embodiment, a magnetic disk drive includes a magnetic recording medium, a medium drive section that drives the magnetic recording medium, a magnetic head having a recording head and a reproducing head, the recording head being a perpendicular recording magnetic head. The perpendicular recording magnetic head includes a main pole having a track portion that defines a recording track width and a flare portion that is formed integrally with the track portion and gradually increases in width in an element height direction. A magnetic-field auxiliary pole and a nonmagnetic layer are stacked on the flare portion, and a nonmagnetic portion is formed on each side face of the magnetic-field auxiliary pole and the nonmagnetic layer. The magnetic head also includes a shield provided on a trailing side and on each cross track side of the main pole and an auxiliary pole. The magnetic disk drive also includes a head drive section that positions the magnetic head above the magnetic recording medium and a control unit coupled to the head drive section for controlling operation of the head drive section. In addition, an interval between the main pole and the shield provided on the trailing side is larger at a position from which the nonmagnetic layer is provided than at a position of a flying surface.

In another general embodiment, a method of manufacturing a perpendicular recording magnetic head includes processing a magnetic-field auxiliary pole and a nonmagnetic layer which are arranged in a stacked orientation on a flare portion of a main pole, forming a nonmagnetic portion on each side face of the magnetic-field auxiliary pole and the nonmagnetic layer, processing the main pole which has a track portion that defines a recording track width, wherein the flare portion is formed integrally with the track portion and gradually increases in width in an element height direction, and forming a shield on a trailing side and each cross track side of the main pole. An interval between the main pole and the shield provided on the trailing side is larger at a position from which the nonmagnetic layer is provided than at a position of a flying surface.

According to some approaches, a perpendicular recording magnetic head has a main pole, shields (hereinafter, called wrap around shields) provided on a trailing side and cross track sides of the main pole, and an auxiliary pole, wherein a magnetic-field auxiliary pole portion including a magnetic layer and a nonmagnetic layer is formed on the main pole. Moreover, the magnetic-field auxiliary pole portion has a flare portion, the flare portion of the auxiliary pole portion is located on or inside a flare portion of the main pole as viewed from an element surface. An end portion of the magnetic-field auxiliary pole portion is formed into a slope shape, and a nonmagnetic portion is formed along the slope shape.

In some approaches, an end shape of the nonmagnetic portion on a flying surface side is formed from a position away from a flying surface to an upper end of the magnetic-field auxiliary pole with an angle in a trailing side direction. The nonmagnetic portion is formed between the wrap around shield and the magnetic-field auxiliary pole portion. Therefore, the wrap around shield has a shield shape reflecting a shape of the nonmagnetic portion because the shield is formed on the nonmagnetic portion. A leading end of the nonmagnetic portion does not appear on the flying surface.

The nonmagnetic layer of the magnetic-field auxiliary pole includes an inorganic insulating film such as $Al_2O_3$ film, or a nonmagnetic material such as NiCr. A cured organic insulating film such as resist may also be used. A material of the nonmagnetic portion, which is formed on the end slope portion on a flying surface side of the magnetic-field auxiliary pole, may include a mixture of an inorganic insulating film including DLC, $Al_2O_3$, or $Al_2O_3$—$SiO_2$ and a nonmagnetic material of Ta, Ru, Cr or NiCr, or some other suitable combination, which may be deposited for a mask configuration in forming the main pole.

A manufacturing method, according to one embodiment, includes a process where a main pole layer, and the magnetic layer and the nonmagnetic layer of the magnetic-field auxiliary pole portion are successively stacked, then the magnetic-field auxiliary pole portion is formed in a first stage, and then the main pole is formed in a second stage. The process is carried out such that high dimensional accuracy of the magnetic-field auxiliary pole and a high track width accuracy of the main pole may be obtained together.

In one embodiment, a magnetic-field auxiliary pole is provided on a main pole, which may prevent decrease in magnetic-field strength due to reduction in thickness of a main pole film with reduction in recording track width. Furthermore, a nonmagnetic layer is disposed on the magnetic-field auxiliary pole, and since a nonmagnetic portion including alumina, which is formed on each side face of the magnetic-field auxiliary pole and the nonmagnetic layer, acts as a spacer between a wrap around shield and the magnetic-field auxiliary pole, magnetic field loss may be prevented. In addition, a shield shape reflecting a shape of the nonmagnetic portion may increase a magnetic field gradient without reducing magnetic field strength. Even from a point of manufacturing, since the magnetic-field pole portion is formed before a step of forming the main pole, and a magnetic-field auxiliary pole pattern is disposed inside a main pole pattern, each magnetic pole can be formed without reducing track width accuracy.

In the following drawings, like functional portions are described with the same reference numerals and signs. FIG. 1 includes conceptual diagrams of a magnetic recording/reproducing device, where FIG. 1(a) is a schematic plan diagram of the device, and FIG. 1(b) is a schematic section diagram thereof, according to some embodiments. The magnetic recording/reproducing device performs recording/reproducing of a magnetization signal by a magnetic head mounted on a slider 4 fixed to a leading of a suspension arm 3 at a predetermined position on a magnetic disk (magnetic recording medium) rotated by a motor 1. A rotary actuator 5 is driven such that the magnetic head can be placed in a position (track) in a radial direction of the magnetic disk. A write signal into the magnetic head and a read signal from the magnetic head are processed by signal processing circuits 6a and 6b.

Figure 2:
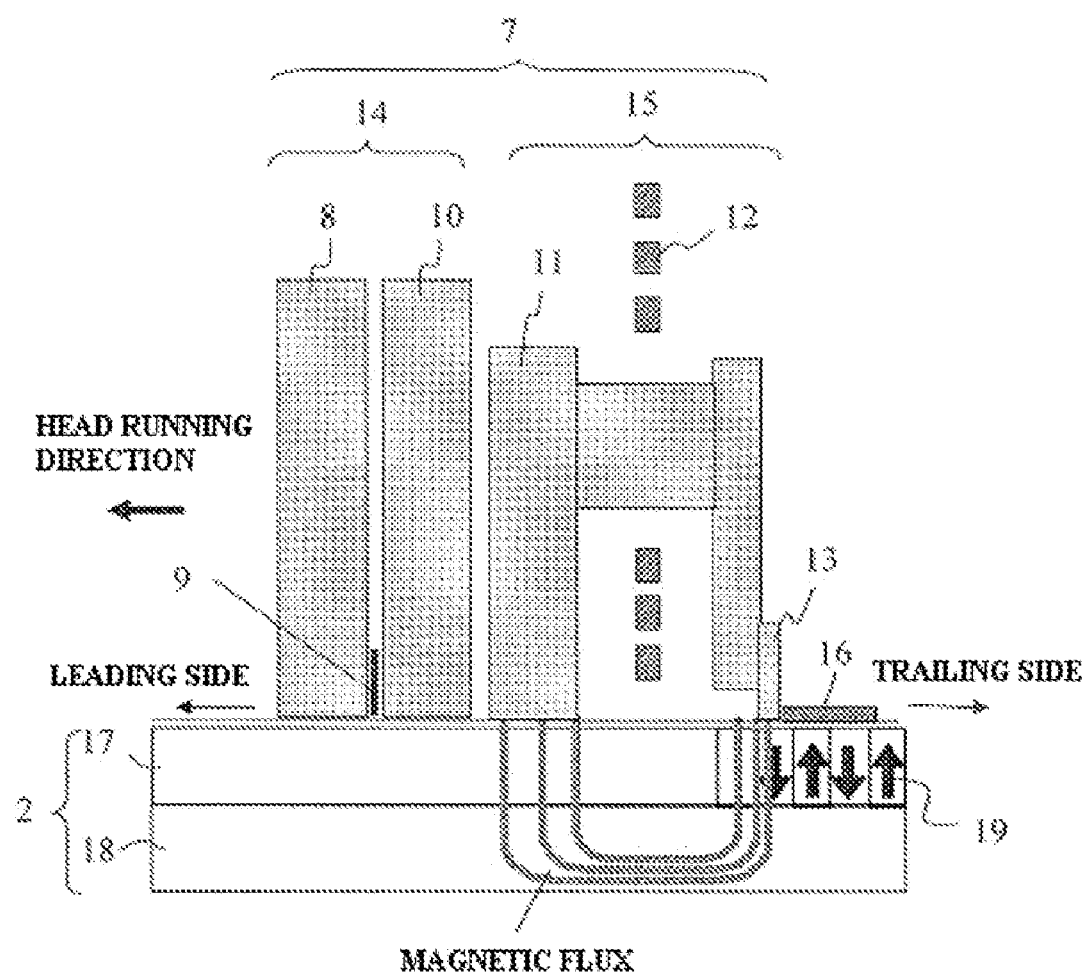
FIG. 2 is a diagram showing outline of operation of perpendicular recording, according to one embodiment.

FIG. 2 is a diagram showing a relationship between a perpendicular magnetic head 7 and the magnetic disk 2, showing an outline of perpendicular recording, according to one embodiment. The perpendicular magnetic head 7 includes a lower reproducing shield 8, a read element 9, an upper reproducing shield 10, an auxiliary pole 11, a thin film coil 12, and a main pole 13, those being stacked in this order from a running direction side (leading side) of the head. The lower reproducing shield 8, the read element 9, and the upper reproducing shield 10 configure a reproducing head 14, and the auxiliary pole 11, the thin film coil 12, and the main pole 13 configure a recording head (single-pole head) 15. The main pole 13 has a track portion that defines recording track width, and a flare portion that is formed integrally with the track portion, and gradually increased in width in an element height direction. A wrap around shield 16 is formed on a trailing side and on both sides in a track width direction of the main pole 13. A flying surface of the track portion of the main pole 13 has an inverted trapezoidal shape being narrow in width on a leading side in consideration of a case that a head is added with a skew angle. A magnetic field emitted from the main pole 13 of the recording head 15 forms a magnetic circuit along which the magnetic field enters the auxiliary pole 11 through a magnetic recording layer 17 and a soil under layer 18 of the magnetic disk 2, and thus records a magnetization pattern 19 in the magnetic recording layer 17. Due to a relationship with a disk rotation direction, a shape of a portion where the main pole 13 finally leaves a particular point on the magnetic disk, that is, a shape of each of an upper face (trailing side) and side faces of the track portion of the main pole has significant influence on a shape of a magnetization pattern. An intermediate layer is formed between the magnetic recording layer 17 and the soft under layer 18 of the magnetic disk 2 in some cases. For the read element 9 of the reproducing head 14, a giant magneto-resistive effect element (GMR), a tunnel magneto-resistive effect element (TMR) or the like is used.

Figure 3:
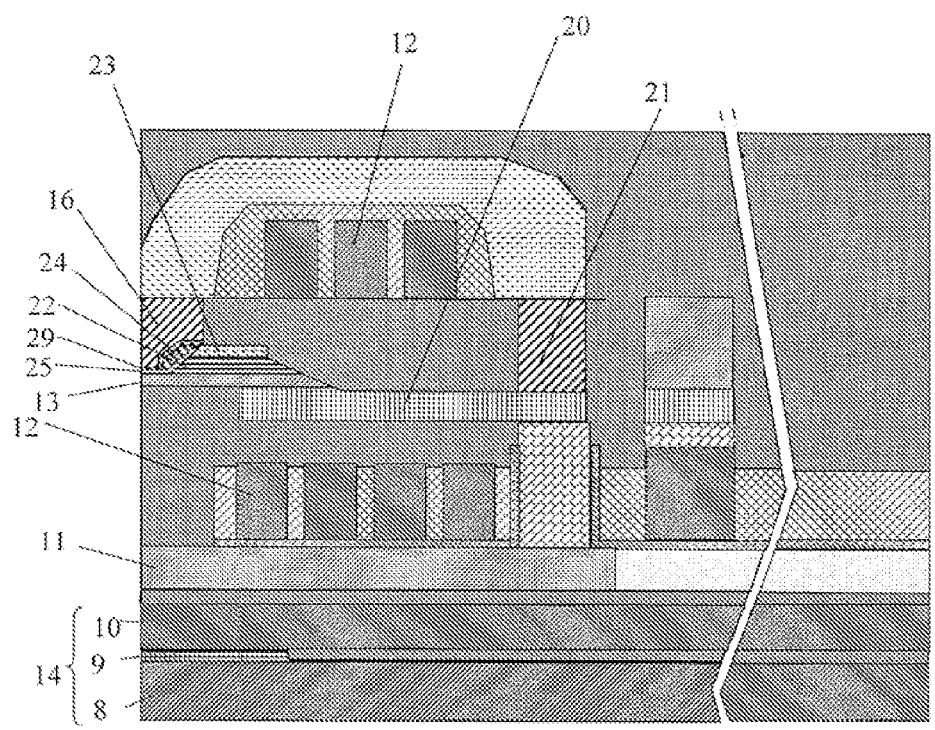
FIG. 3 is a section diagram in an element height direction of a perpendicular recording magnetic head, according to one embodiment.

FIG. 3 shows a section diagram in an element height direction of a perpendicular recording magnetic head, according to one embodiment. A yoke 20 is connected with the auxiliary pole 11 via a back gap 21. The shown perpendicular recording magnetic head has a helical coil structure in which a thin film coil 12 revolves around the main pole 13 and the yoke 20. However, a perpendicular recording magnetic head having a pancake structure also exists, in which the thin film coil revolves around the back gap 21.

Figure 4:
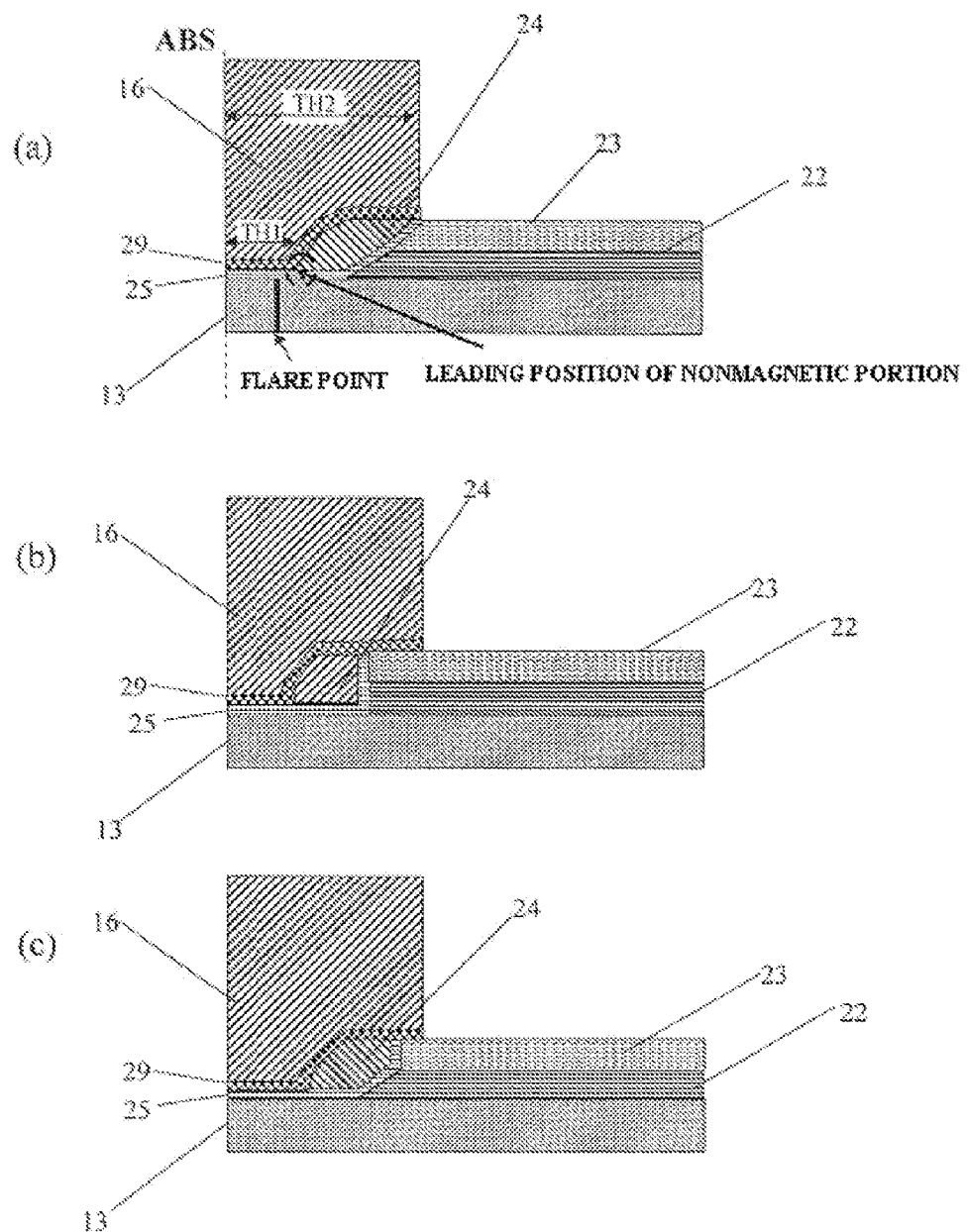
FIG. 4 is a schematic section diagram of a portion near a main pole of the perpendicular recording magnetic head, according to one embodiment.

FIG. 4 includes schematic section diagrams showing a structure of a portion near the main pole of the perpendicular recording magnetic head, according to one embodiment. In the perpendicular recording magnetic head, a magnetic-field auxiliary pole 22 and a nonmagnetic layer 23 are stacked on the flare portion of the main pole 13. From a point of ensuring a magnetic field gradient and process accuracy, an end portion in a flying surface direction of the stacked film is desirably formed into a taper shape in which thickness of the stacked film is gradually increased in an element height direction as shown in FIG. 4(a). However, the stacked two films may be formed into a perpendicular shape as shown in FIG. 4(b). Alternatively, the films may be separately formed as shown in FIG. 4(c), in which the nonmagnetic layer 23 is formed into a perpendicular shape, and the magnetic-field auxiliary pole 22 is formed into a taper shape.

A nonmagnetic portion 24 is formed via a trailing gap 25 on the side face having a taper shape on a flying surface side of each of the magnetic-field auxiliary pole 22 and the nonmagnetic layer 23. As shown in FIG. 4(a), an upper surface of the nonmagnetic portion 24 is formed with an angle from a leading position of the nonmagnetic portion 24 to an upper end on the flying surface side of the nonmagnetic layer 23, according to one embodiment. The leading position of the nonmagnetic portion 24 does not appear on a flying surface.

Since the wrap around shield 16 is formed on the nonmagnetic portion 24 and on a plating base film 29, when wrap around shield depth on a trailing gap 25 is assumed as TH1, and depth to a rear end of the wrap around shield is assumed as TH2, a shield shape having a relationship of TH1<TH2 is given as shown in FIG. 4(a). An interval between a main pole magnetic body including the main pole 13 combined with the magnetic-field auxiliary pole 22 and the wrap around shield 16 is approximately constant and kept short from the flying surface to a leading position of the nonmagnetic portion as viewed in the element height direction, according to one embodiment. However, the interval is gradually increased from a region near a flare point from which the nonmagnetic portion 24 is formed, and spaced by a distance corresponding to approximately thickness of the nonmagnetic layer 23 at the rear end of the wrap around shield. According to such a structure, in a track portion of the main pole, the interval between the main pole and the wrap around shield is short, and the wrap around shield may efficiently absorb magnetic flux generated from the track portion, according to one embodiment. On the other hand, in a region away from the track portion of the main pole, the interval between the main pole and the shield 16 is increased due to existence of the nonmagnetic portion 24 and the nonmagnetic layer 23, so that amount of magnetic field absorbed by the wrap around shield is reduced, which may prevent magnetic field loss, resulting in increase in magnetic field strength and increase in magnetic field gradient at a position of the magnetic recording film.

Figure 5:
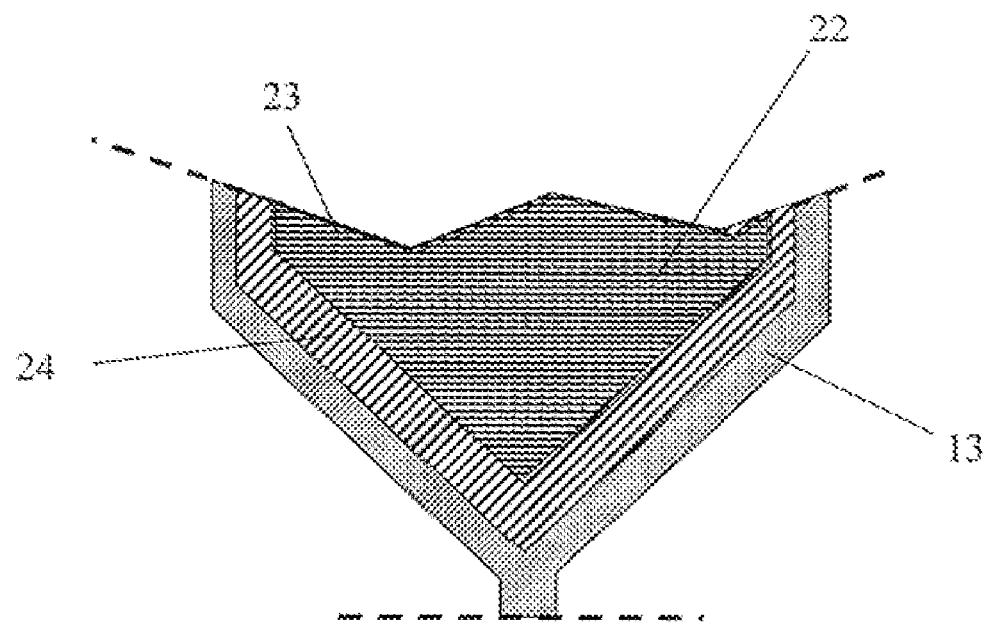
FIG. 5 is a diagram showing a positional relationship between a magnetic-field auxiliary pole pattern and a main pole pattern as viewed from an element surface, according to one embodiment.

FIG. 5 shows a positional relationship between a magnetic-field auxiliary pole pattern and a main pole pattern as viewed from an element surface, according to one embodiment. While described later, even from a viewpoint of ensuring track width accuracy, the pattern of the magnetic-field auxiliary pole 22 is desirably disposed inside the main pole 13 pattern, and particularly desirably disposed inside a pattern of the flare portion. Moreover, the auxiliary pole pattern is preferably shaped in accordance with the main pole pattern. As shown in FIG. 5, the nonmagnetic portion 24 is formed along a flare shape of the magnetic-field auxiliary pole 22.

Figure 6:
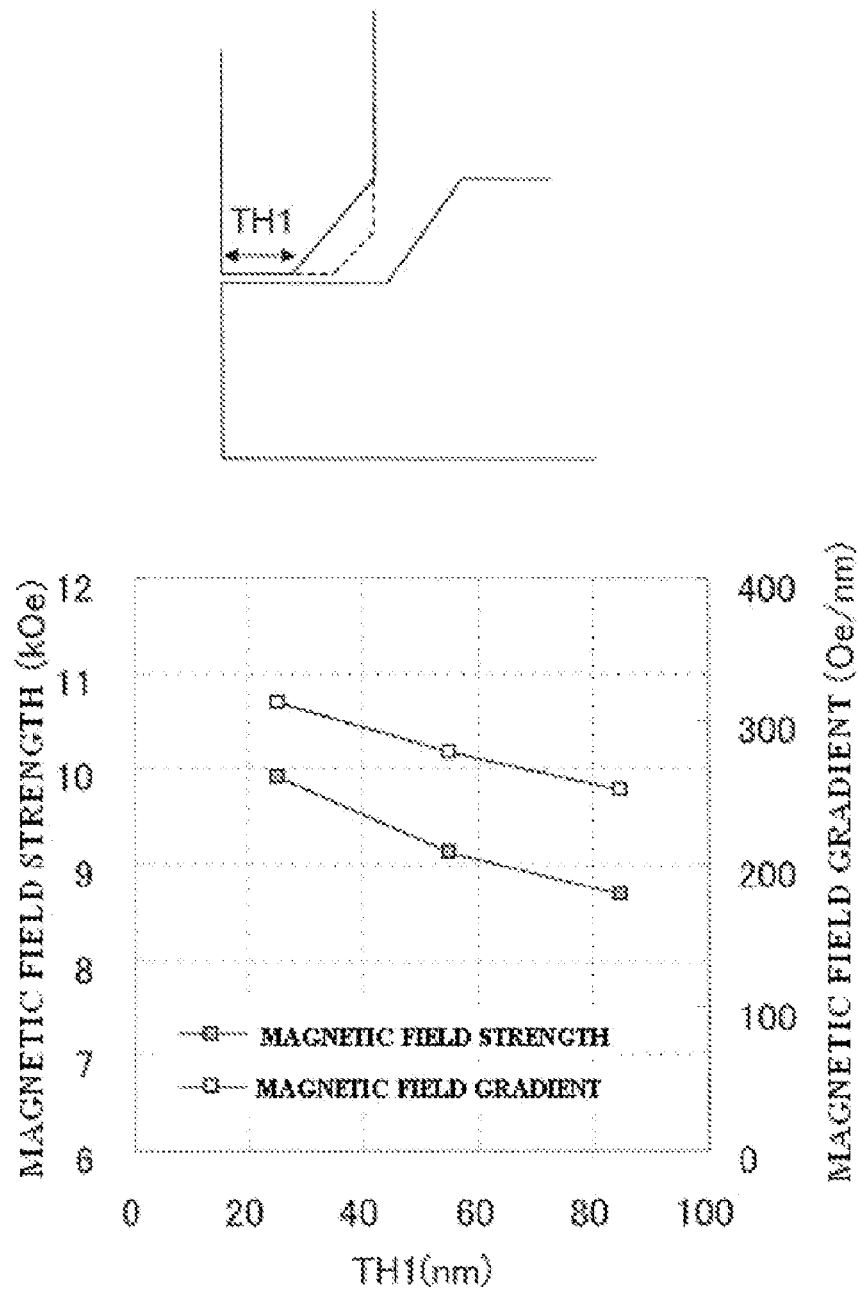
FIG. 6 is a diagram showing a relationship between wrap around shield depth TH1 on a trailing gap, magnetic field strength, and a magnetic field gradient, according to one embodiment.

FIG. 6 is a diagram showing magnetic field strength and a magnetic field gradient, which are obtained by calculation, in the case of changing the wrap around shield depth TH1 on the trailing gap, according to one embodiment. A horizontal axis shows wrap around shield depth TH1 on the trailing gap, and a vertical axis shows magnetic field strength and a magnetic field gradient at a position of a track width center of the main pole. It is known from a result of the calculation that when TH1 is reduced, the magnetic field strength is increased, and furthermore, the magnetic field gradient becomes larger. Lengthening of TH1 is the same thing that section area of the nonmagnetic portion 24 shown in FIG. 4 is decreased. Therefore, it is known that a shape of the nonmagnetic portion 24, and a shape of the wrap around shield reflecting the shape of the nonmagnetic portion affect head performance.

FIG. 7 is a diagram showing a relationship between an angle TSA of a rear end portion of the wrap around shield on the trailing gap 25, a taper angle TETA of an end portion on a flying surface side of a stacked film of the magnetic-field auxiliary pole 22 and the nonmagnetic layer 23, and a magnetic field gradient at the position of the track width center of the main pole, according to one embodiment. A horizontal axis shows the angle TSA of the rear end portion of the wrap around shield, and a vertical axis shows a magnetic field gradient normalized by magnetic field strength in the cases of TETA of 30°, 45° and 60°. The diagram shows that when TSA is larger, and TETA is smaller, the magnetic field gradient normalized by magnetic field strength becomes larger. High track density and high line recording density can be achieved by setting TSA and TETA in this way.

Figure 8:
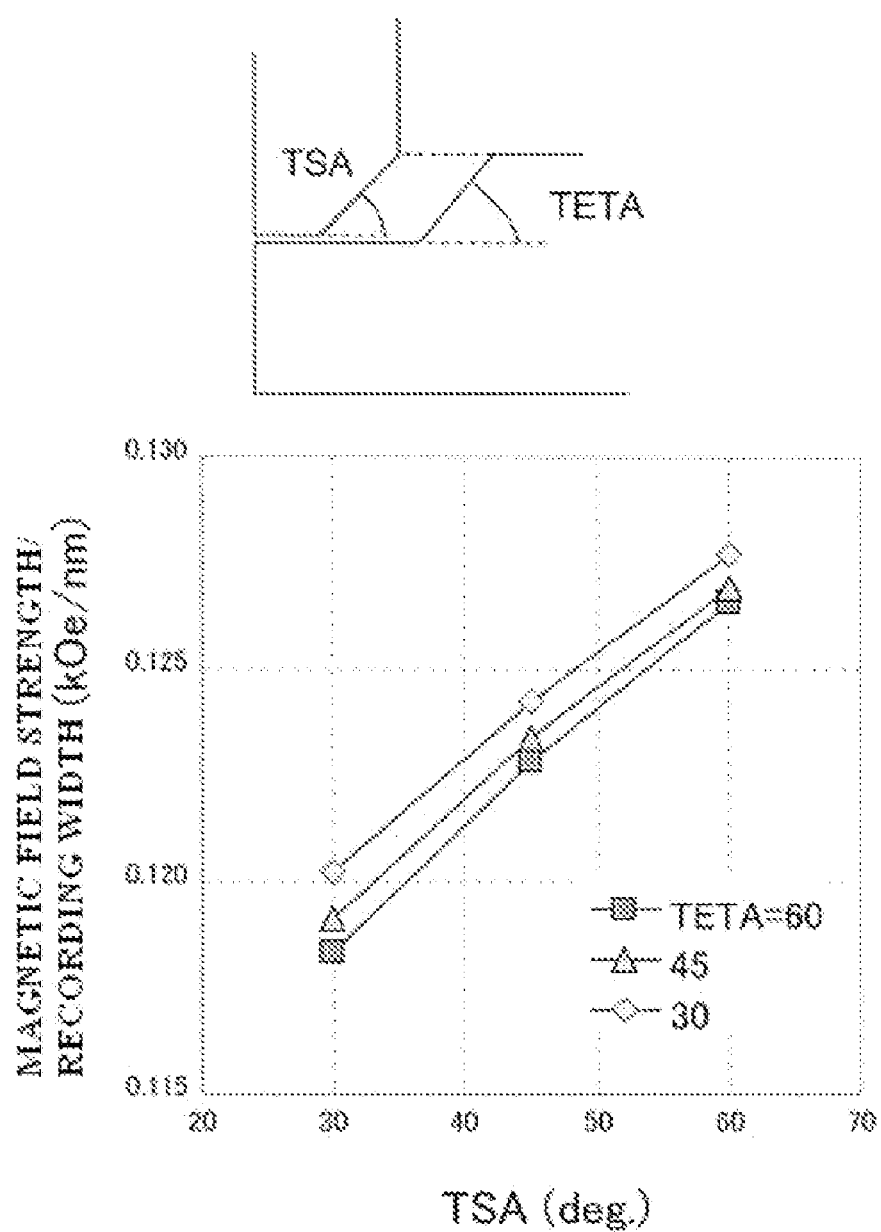
FIG. 8 is a diagram showing a relationship between the angle TSA of the rear end portion of the wrap around shield, the taper angle TETA of the end portion on the flying surface side of the stacked film of the magnetic-field auxiliary pole and the nonmagnetic layer, and magnetic field strength normalized by recording width, according to one embodiment.

FIG. 8 is a diagram showing the angle TSA of the rear end portion of the wrap around shield on the trailing gap, the taper angle TETA of the end portion on the flying surface side of the stacked film of the magnetic-field auxiliary pole 22 and the nonmagnetic layer 23, and magnetic field strength normalized by recording width at the position of the track width center of the main pole, according to one embodiment. A result of the calculation shows that when TSA is larger, and TETA is smaller, a stronger magnetic field may be converged into a small region, which shows that high track density and high signal quality may be obtained together.

Figure 9:
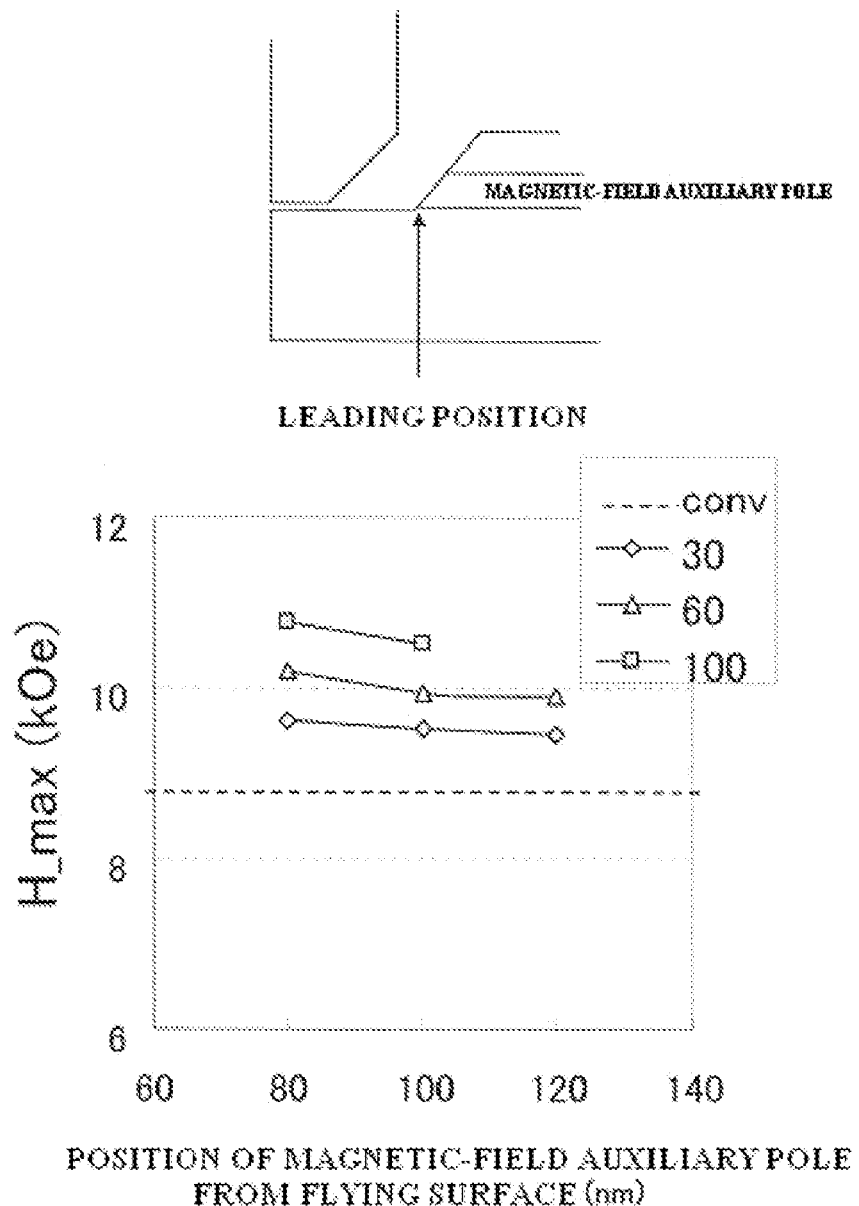
FIG. 9 is a diagram showing a relationship between thickness of the magnetic-field auxiliary pole and magnetic field strength, according to one embodiment.

FIG. 9 is a diagram showing a relationship between thickness of the magnetic-field auxiliary pole and magnetic field strength, according to one embodiment. A horizontal axis shows a position of a leading of the magnetic-field auxiliary pole from a flying surface, and a vertical axis shows magnetic field strength at the position of the track width center of the main pole. The diagram shows calculation results in a case that the magnetic-field auxiliary pole is not provided (cony), and cases that thicknesses of the magnetic-field auxiliary pole are 30 nm, 60 nm and 100 nm, respectively. From the calculation results, magnetic field strength is increased in a structure where the magnetic-field auxiliary pole is provided compared with a structure where the auxiliary pole is not added, and the magnetic field strength tends to be increased with increase in thicknesses of the magnetic-field auxiliary pole. Consequently, thickness of the magnetic-field auxiliary pole is preferably increased within a range where process accuracy can be ensured.

FIG. 10 is a diagram showing a relationship between a position of the leading of the magnetic-field auxiliary pole from the flying surface and magnetic field strength, according to one embodiment. A horizontal axis shows the position of the magnetic-field auxiliary pole from the flying surface, and a vertical axis shows magnetic field strength at the position of the track width center of the main pole. The diagram shows calculation results in a case that the magnetic-field auxiliary pole is not provided (cony), and a case that thickness of the magnetic-field auxiliary pole is 30 nm. From the calculation results, magnetic field strength is increased as the leading of the magnetic-field auxiliary pole is made closer to the flying surface. Consequently, the magnetic-field auxiliary pole is preferably made to be close to the flying surface to the utmost.

Figure 11:
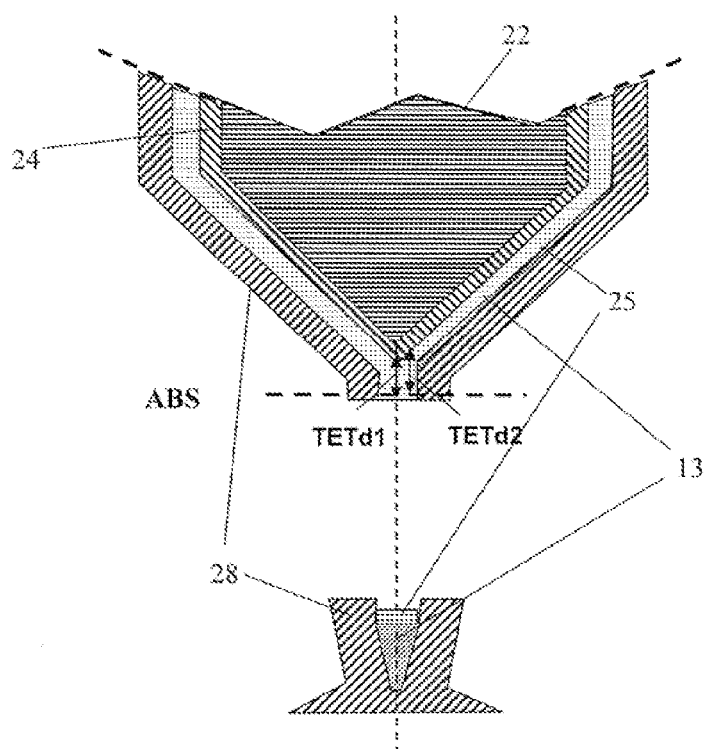
FIG. 11 is a diagram showing a positional relationship between a pattern of the magnetic-field auxiliary pole and a pattern of the main pole as viewed from an element surface, according to one embodiment.

FIG. 11 is a diagram showing a positional relationship between a pattern of the magnetic-field auxiliary pole 22 and a pattern of the main pole as viewed from an element surface, according to one embodiment. The magnetic-field auxiliary pole is formed on the flare portion of the main pole. Since the pattern of the magnetic-field auxiliary pole 22 has a flare shape in accordance with the flare portion of the main pole, the pattern forms the vertex of a triangle on a flying surface side. When a distance from the track width center to the leading of the magnetic-field auxiliary pole is assumed as TETd1, and a distance from a track width end to the magnetic-field auxiliary pole 22 is assumed as TETd2, TETd1<TETd2 is given. Since the distance TETd1 is smaller, it is expected even from this pattern shape that magnetic field strength and a magnetic field gradient are increased at the track center.

Figure 12:
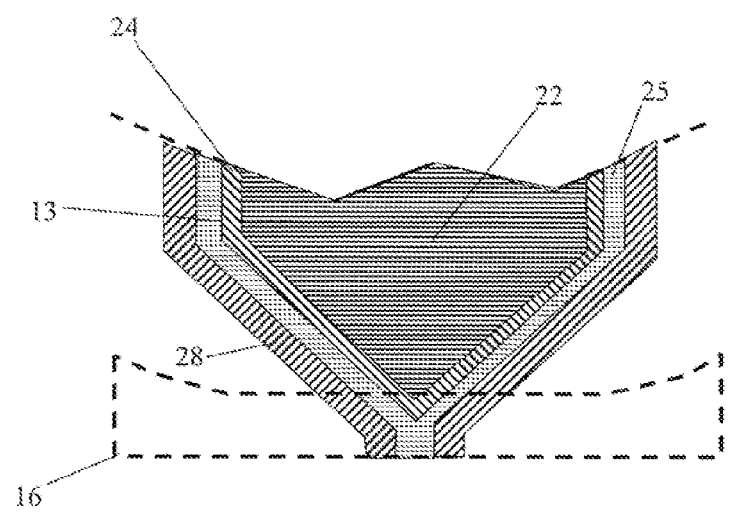
FIG. 12 is a diagram showing a positional relationship between the main pole and the wrap around shield, according to one embodiment.

FIG. 12 is a diagram showing a planar shape of the main pole and a planar shape (shown by a dotted line) of the wrap around shield 16, according to one embodiment. As shown in the figure, the wrap around shield 16 has such a planar shape that as the shield is more away from the main pole in a track width direction, the shield is expanded in a direction approaching the flare of the main pole. Accordingly, the nonmagnetic portion 24 is formed on the main pole along each edge of the main pole even in the back of the flare portion of the main pole, thereby a magnetic field emitted from the main pole is advantageously prevented from leaking into the wrap around in the back from the flare point.

Figure 13:
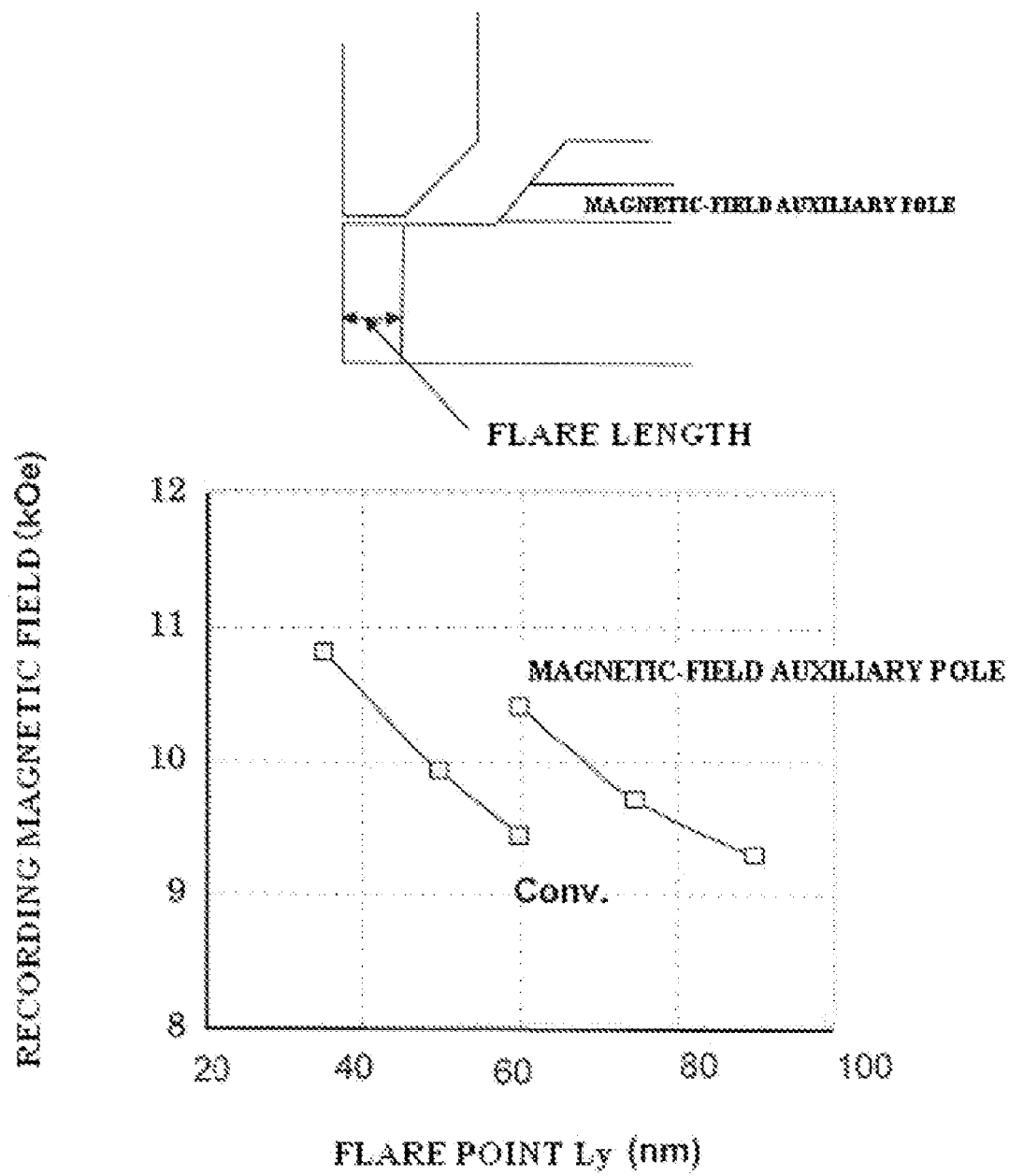
FIG. 13 is a diagram showing a degree of influence of the magnetic-field auxiliary pole on the flare length when the auxiliary pole is provided on the main pole, according to one embodiment.

FIG. 13 is a diagram showing a degree of influence of the magnetic-field auxiliary pole on the flare length when the auxiliary pole is provided on the main pole, according to one embodiment. A horizontal axis shows flare length, and a vertical axis shows magnetic field strength. As a calculation condition, thickness of the magnetic-field auxiliary pole was assumed as 60 nm, and a leading position of the magnetic-field auxiliary pole was assumed to be the same position of the flare point. As a result, when a normal structure having only the main pole is compared to a structure where the magnetic-field auxiliary pole is added on the main pole at a flare length of 60 nm, magnetic field strength is higher by about 1 kOe in the structure added with the magnetic-field auxiliary pole. This shows that the flare length can be lengthened by about 20 nm in flare point equivalent, and therefore not only improvement in recording performance but also improvement in yield in mass production can be expected from this structure, according to some embodiments.

Figure 14:
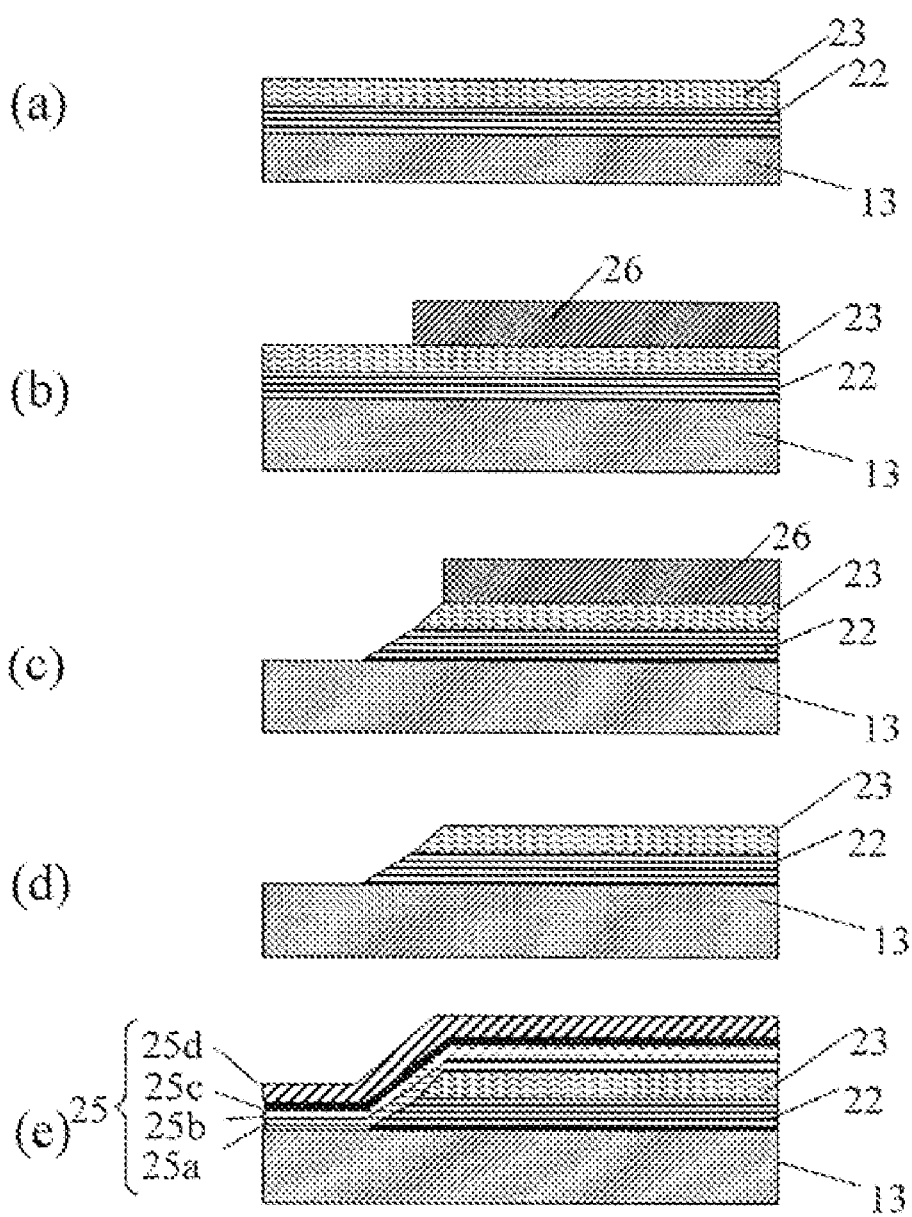
FIG. 14 is a process flow diagram for manufacturing the perpendicular recording magnetic head, according to one embodiment.
Figure 15:
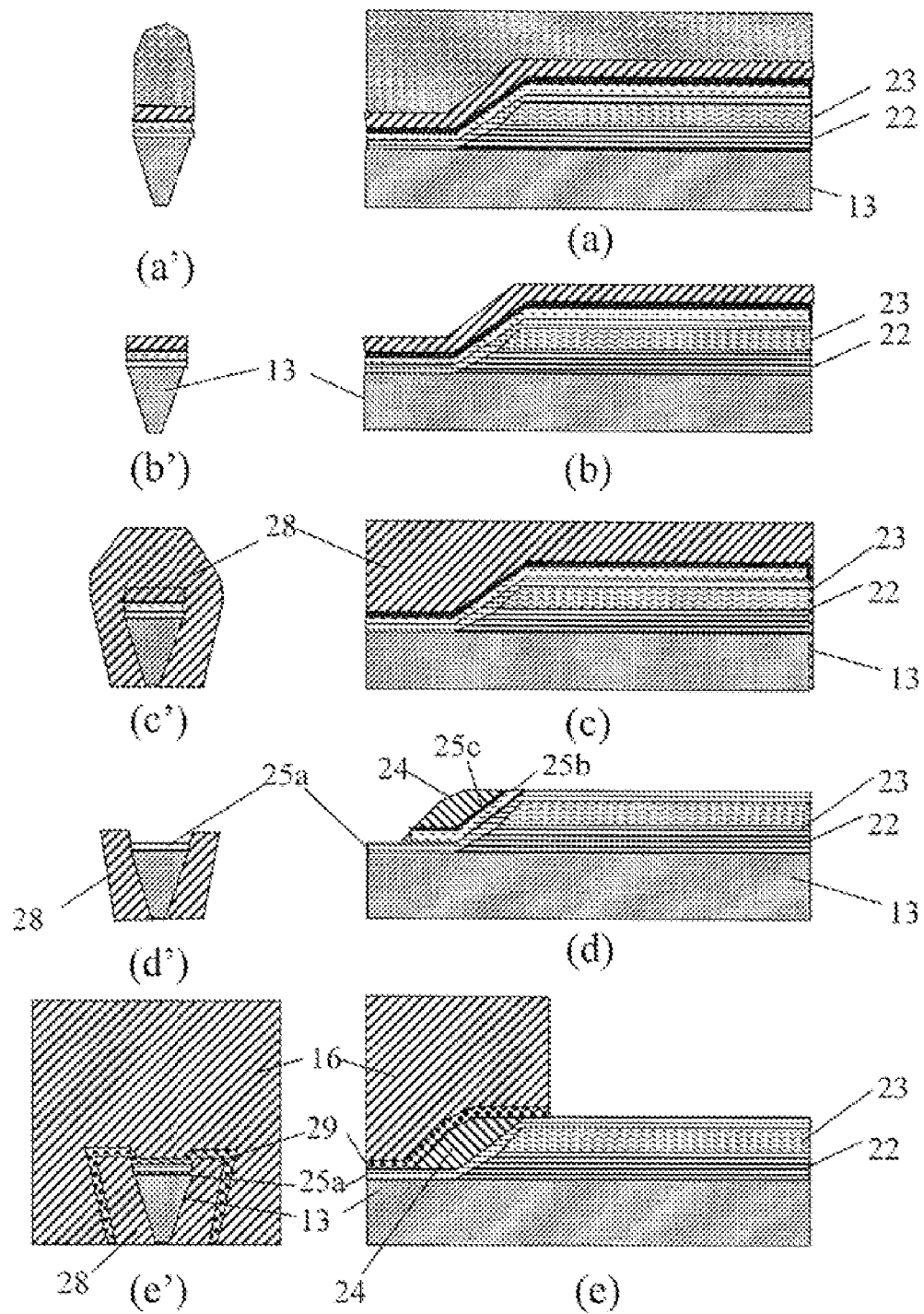
FIG. 15 is a process flow diagram for manufacturing the perpendicular recording magnetic head, according to one embodiment.

FIGS. 14 and 15 are process flow diagrams for manufacturing the perpendicular recording magnetic head, according to several embodiments. FIG. 14(a) is a diagram showing a state where a layer of the main pole 13, a layer of the magnetic-field auxiliary pole 22, and the nonmagnetic layer 23 have been successively deposited on a flat surface. As the main pole 13 layer, an FeCo/Cr/FeCo antiferromagnetic coupling stacked film, an Ni—Fe film, and an FeCo/Cr/FeCo antiferromagnetic coupling stacked film are sequentially deposited on an NiCr base film, and furthermore an NiCr protective film is successively deposited thereon. The FeCo/Cr/FeCo antiferromagnetic coupling stacked film suppresses pole erasure by reducing residual magnetization. A plurality of FeCo/Cr/FeCo antiferromagnetic coupling stacked films, which are reduced in magnetic coupling by inserting the NiFe film, NiCr film or the like having smaller spontaneous magnetization than the FeCo film, are provided, thereby when each FeCo film is reduced in thickness, antiferromagnetic coupling is enhanced, and consequently residual magnetization can be reduced. Therefore, while the FeCo/Cr/FeCo antiferromagnetic coupling stacked films are deposited twice with NiFe in between herein, the number of the FeCo/Cr/FeCo antiferromagnetic coupling stacked films may be further increased with the NiFe film or the like in between.

Furthermore, an FeCo single-layer film is deposited thereon as a film for the magnetic-field auxiliary pole 22. When the FeCo single-layer film is replaced with an FeCo/Cr/FeCo antiferromagnetic coupling stacked film as above, pole erasure can be preferably suppressed. Furthermore, NiCr was successively deposited as the nonmagnetic layer 23. For the nonmagnetic layer, Ta, Cr or Ru may be used in addition to NiCr. Alternatively, an oxide such as alumina, or an organic film such as resist may be used, according to some embodiments.

FIG. 14(b) is a diagram showing a state where a photoresist pattern 26 for a magnetic field pole, which has a flare portion in an element height direction, has been formed on the nonmagnetic layer 23. A leading in the element height direction of the magnetic-field auxiliary pole 22 is preferably disposed at a position close to a flying surface. Pattern position accuracy is dominated by misalignment accuracy of an exposure unit used in a photo process. In the case of forming the magnetic-field auxiliary pole 22, an ArF scanner (dry) having the highest positioning accuracy was used, and dry ArF photoresist was used. When the resist was exposed at a condition of light exposure of 9.5 mj/cm$^2$ and focus of 0.2 µm, a desired pattern shape was obtained. Misalignment accuracy, which was most important, was ±20 nm.

Next, as shown in FIG. 14(c), etching is performed using ion milling up to the magnetic-field auxiliary pole 22 layer through the nonmagnetic layer 23 with the photoresist pattern 26 as a mask, and the ion milling is stopped at the main pole 13 layer. A taper shape of each side face of the nonmagnetic layer 23 and the magnetic-field auxiliary pole 22 layer is determined by an incident angle of the ion milling. In this process, etching was performed while rotating a substrate with the incident angle of −30°, as a result, the taper angle (α) of 20° to 30° was obtained. Next, as shown in FIG. 14(d), the resist 26 is removed. Next, as shown in FIG. 14(e), a mask layer 25 for forming the main pole is formed. Details of the mask layer 25 are alumina to be a trailing gap 25a, and an inorganic insulator 25b for an etching stopper, which may be an inorganic insulator containing C such as DLC, or a material such as SiO$_2$, Si$_3$N$_4$, etc. Furthermore, a nonmagnetic material layer 25c for milling endpoint is provided, and Ta, Cr, Ta$_2$O$_5$, etc., may desirably be used as the material. In addition, an inorganic insulating layer 25d such as alumina is provided as a mask for milling of the main pole.

FIG. 15(a) is a diagram showing a state where an organic film 27 is formed using milling for processing the main pole 13 into an inverted trapezoidal shape, according to one embodiment. The main pole 13 is processed by ion milling with the organic film 27 as a mask. As a result, a main pole can be formed, which has an inverted trapezoidal shape as shown in FIG. 15(a') as viewed from the flying surface. FIG. 15(b) is a diagram showing a state where the organic mask has been removed. Main pole processing is finished at this step.

Figure 16:
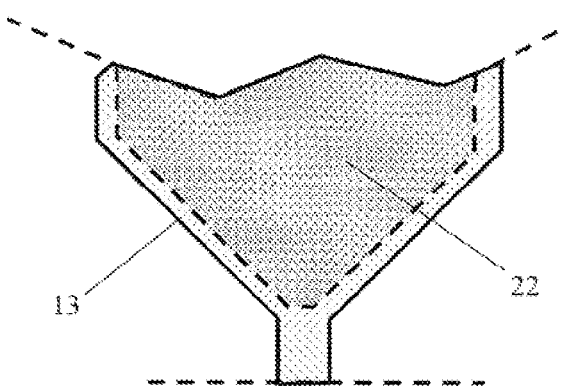
FIG. 16 is a diagram showing a positional relationship between a main pole pattern and a magnetic-field auxiliary pole pattern, according to one embodiment.

FIG. 16 shows a pattern of the main pole 13 and a pattern of the magnetic-field auxiliary pole 22, according to one embodiment. The pattern of the magnetic-field auxiliary pole 22 is located inside a pattern of a flare portion configuring the main pole 13. Since the pattern of the magnetic-field auxiliary pole 22 is disposed inside the pattern of the main pole 13, influence of the ion milling on the main pole pattern may be minimized.

FIG. 15(c) is a diagram showing a state where alumina 28 film to be a side gap has been formed, according to one embodiment. FIG. 15(c') is a diagram showing the state as viewed from the flying surface. The alumina 28 used for forming the side gap was formed using ALD (Atomic Layer Deposition) because high thickness accuracy was required for the side gap. The ALD equipment is used, such that an adhesion profile of the alumina 28 as shown in FIG. 15(c') is given, and furthermore such a thickness accuracy that variation in thickness of the alumina film is 1% or less can be obtained.

Figure 17:
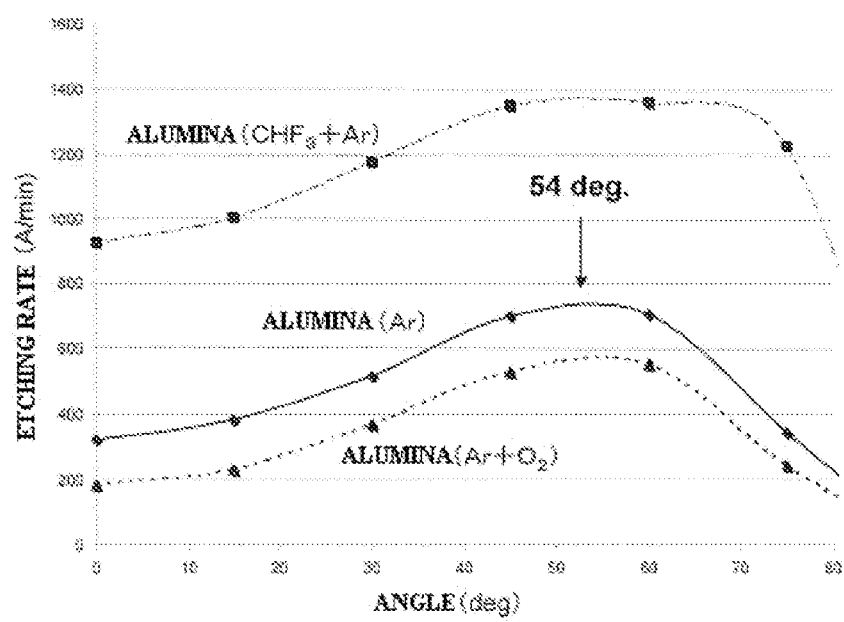
FIG. 17 is a diagram showing a difference in etching rate of alumina depending on a milling incident angle, according to one embodiment.

FIG. 15(d) is a diagram showing a result of flattening performed to a trailing gap portion on the main pole 13 by using ion milling, according to one embodiment. An incident angle of the ion milling was 55°. The angle was determined from data of differences between etching rates as shown in FIG. 17. It is known from the experimental result that the milling rate is fastest near an incident angle of 54°, and a milling rate tends to be slower at an angle larger or smaller than 54°. Endpoint detection is performed using the nonmagnetic material layer 25c for stopping the milling, so that the milling can be finished at high accuracy. Next, the etching stopper layer 25b is completely removed, thereby a flattened shape can be formed without affecting the trailing gap 25a. By using this condition, a flattened shape of a top of the main pole can be achieved as shown in FIG. 15(d'), according to one embodiment.

As shown in FIG. 15(d), a nonmagnetic portion 24 including alumina for forming the gap is left on the taper shape portion on each side face of the magnetic-field auxiliary pole 22 and the nonmagnetic layer 23, according to one embodiment. This is due to a difference in etching rate of alumina depending on the incident angle as described before. When this processing condition is used, the nonmagnetic portion 24 is necessarily left. Since the mask materials for the main pole, 25b and 25c, are embedded, materials of the nonmagnetic portion include alumina, an inorganic compound containing C such as DLC or a material such as $SiO_2$, $Si_3N_4$, and a nonmagnetic material such as Ta, $Ta_2O_5$, Cr, etc. The shape of the nonmagnetic portion 24 provides one of the most characteristic shapes in the process, and will affect other shapes as well.

FIG. 15(e) is a diagram showing a state where a wrap around shield is formed by plating, according to one embodiment. As shown in the figure, since the shield is formed on the nonmagnetic portion 24 including alumina left in the preceding step, a shape of the shield reflects a shape of the nonmagnetic portion. In this way, a manufacturing process shown in FIGS. 14 and 15 is carried out, thereby a structure shown in FIG. 15(e) can be produced.

According to one embodiment, the magnetic-field auxiliary pole 22 is formed at a position retracted from the flying surface on the main pole, which may prevent reduction in magnetic field strength due to reduction in thickness of the main pole film with reduction in recording track width. Furthermore, the magnetic-field auxiliary pole 22 is formed such that thickness of the auxiliary pole is large, and a position thereof is made as close to the flying surface as possible, thereby magnetic field strength can be increased. Moreover, since the nonmagnetic portion 24 including alumina and the like, which is formed on each side face of the nonmagnetic layer 23 and the magnetic-field auxiliary pole 22, acts as a spacer between the wrap around shield 16 and the main pole 13, and a spacer between the wrap around shield 16 and the magnetic-field auxiliary pole 22, magnetic field loss can be prevented. In addition, the wrap around shield 16 having such a structure may prevent magnetic field saturation, and therefore increase in magnetic field gradient can be expected.

Even from the viewpoint of manufacturing, since a layer for the magnetic-field auxiliary pole 22 and the nonmagnetic layer 23 may be successively formed on a film for the main pole 13, and a photo pattern of the magnetic-field auxiliary pole is formed on a flattened surface, alignment accuracy can be improved, according to one embodiment. Moreover, a step of forming the magnetic-field auxiliary pole 22 and the nonmagnetic layer 23 is performed as a step prior to a step of forming the main pole 13, thereby the main pole 13 can be processed without being affected by ion milling, in addition, track width accuracy can be ensured.

The perpendicular recording magnetic head is mounted in a magnetic recording/reproducing device such that track density and line density can be improved, and a magnetic recording/reproducing device having surface recording density of 750 Gbit/$in^2$ can be produced, according to one embodiment.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular recording magnetic head, comprising:
a main pole, comprising:
  a track portion that defines a recording track width; and
  a flare portion that is formed integrally with the track portion and gradually increases in width in an element height direction,
  wherein a magnetic-field auxiliary pole and a nonmagnetic layer are stacked on the flare portion,
  wherein a nonmagnetic portion is formed on a portion of a trailing gap separating each side face of the magnetic-field auxiliary pole and the nonmagnetic layer from the nonmagnetic portion;
an auxiliary pole; and
a shield provided on a trailing side and each cross track side of the main pole,
wherein an interval between the main pole and the shield provided on the trailing side is larger at a position from which the nonmagnetic layer is provided than at a position of a flying surface.

2. The perpendicular recording magnetic head according to claim 1, wherein the magnetic-field auxiliary pole comprises a multilayer film including a magnetic layer and a nonmagnetic layer.

3. The perpendicular recording magnetic head according to claim 1, wherein the nonmagnetic portion is formed with an angle toward an upper end of the magnetic-field auxiliary pole in the element height direction.

4. The perpendicular recording magnetic head according to claim 3, wherein the magnetic-field auxiliary pole comprises a multilayer film including a magnetic layer and a nonmagnetic layer.

5. The perpendicular recording magnetic head according to claim 1, wherein the nonmagnetic portion is formed between the shield and the magnetic-field auxiliary pole.

6. The perpendicular recording magnetic head according to claim 1, wherein a leading position in a flying surface direction of the nonmagnetic portion is located near a back in the element height direction from the flying surface.

7. The perpendicular recording magnetic head according to claim 1, wherein the nonmagnetic layer includes at least one of: an inorganic insulating material, a nonmagnetic material, and an organic insulating material.

8. The perpendicular recording magnetic head according to claim 1, wherein the nonmagnetic portion includes a mixture of an inorganic insulating material and a nonmagnetic material.

9. A perpendicular recording magnetic head comprising:
a main pole, comprising:
a track portion that defines a recording track width; and
a flare portion that is formed integrally with the track portion and gradually increases in width in an element height direction,
wherein a magnetic-field auxiliary pole and a nonmagnetic layer are stacked on the flare portion,
wherein a nonmagnetic portion is formed on each side face of the magnetic-field auxiliary pole and the nonmagnetic layer;
an auxiliary pole; and
a shield provided on a trailing side and each cross track side of the main pole,
wherein an interval between the main pole and the shield provided on the trailing side is larger at a position from which the nonmagnetic layer is provided than at a position of a flying surface, and
wherein a planar shape of the magnetic-field auxiliary pole has a smaller area than a planar shape of the flare portion.

10. The perpendicular recording magnetic head according to claim 9, wherein the nonmagnetic portion is formed with an angle toward an upper end of the magnetic-field auxiliary pole in the element height direction.

11. The perpendicular recording magnetic head according to claim 10, wherein the magnetic-field auxiliary pole comprises a multilayer film including a magnetic layer and a nonmagnetic layer.

12. The perpendicular recording magnetic head according to claim 11, wherein the nonmagnetic portion is formed between the shield and the magnetic-field auxiliary pole.

13. The perpendicular recording magnetic head according to claim 12, wherein a leading position in a flying surface direction of the nonmagnetic portion is located near a back in the element height direction from the flying surface.

14. The perpendicular recording magnetic head according to claim 13, wherein the nonmagnetic layer includes at least one of: an inorganic insulating material, a nonmagnetic material, and an organic insulating material.

15. The perpendicular recording magnetic head according to claim 14, wherein the nonmagnetic portion includes a mixture of an inorganic insulating material and a nonmagnetic material.

16. A magnetic disk drive, comprising:
a magnetic recording medium;
a medium drive section that drives the magnetic recording medium;
a magnetic head having a recording head and a reproducing head, the recording head being a perpendicular recording magnetic head comprising:
a main pole, having:
a track portion that defines a recording track width; and
a flare portion that is formed integrally with the track portion and gradually increases in width in an element height direction,
wherein a magnetic-field auxiliary pole and a nonmagnetic layer are stacked on the flare portion, and
wherein a nonmagnetic portion is formed via a trailing gap on each side face of the magnetic-field auxiliary pole and the nonmagnetic layer;
a shield provided on a trailing side and on each cross track side of the main pole; and
an auxiliary pole;
a head drive section that positions the magnetic head above the magnetic recording medium; and
a control unit coupled to the head drive section for controlling operation of the head drive section,
wherein an interval between the main pole and the shield provided on the trailing side is larger at a position from which the nonmagnetic layer is provided than at a position of a flying surface.

17. The magnetic disk drive according to claim 16, wherein the nonmagnetic portion includes a mixture of an inorganic insulating material and a nonmagnetic material.

18. A method of manufacturing a perpendicular recording magnetic head, the method comprising:
processing a magnetic-field auxiliary pole and a nonmagnetic layer which are arranged in a stacked orientation on a flare portion of a main pole;
forming a nonmagnetic portion via a trailing gap on each side face of the magnetic-field auxiliary pole and the nonmagnetic layer, wherein the trailing gap is positioned between the nonmagnetic portion and each side face of the magnetic-field auxiliary pole and the nonmagnetic layer;
processing the main pole which has a track portion that defines a recording track width, wherein the flare portion is formed integrally with the track portion and gradually increases in width in an element height direction; and
forming a shield on a trailing side and each cross track side of the main pole,
wherein an interval between the main pole and the shield provided on the trailing side is larger at a position from which the nonmagnetic layer is provided than at a position of a flying surface.

19. The method according to claim 18, wherein the magnetic-field auxiliary pole comprises a multilayer film including a magnetic layer and a nonmagnetic layer.

20. The method according to claim 18, wherein the nonmagnetic portion is formed with an angle toward an upper end of the magnetic-field auxiliary pole in the element height direction.

21. The method according to claim 18, wherein a planar shape of the magnetic-field auxiliary pole has a smaller area than a planar shape of the flare portion.

22. The method according to claim 18, wherein the nonmagnetic portion includes a mixture of an inorganic insulating material and a nonmagnetic material.

* * * * *

UNITED STATES PATENT AND TRADEMARK OFFICE
CERTIFICATE OF CORRECTION

PATENT NO. : 8,351,154 B2
APPLICATION NO. : 12/636659
DATED : January 8, 2013
INVENTOR(S) : Etoh et al.

Page 1 of 1

It is certified that error appears in the above-identified patent and that said Letters Patent is hereby corrected as shown below:

In the specification:

col. 6, line 42 replace "soil" with --soft--;

col. 8, line 45 replace "(cony)," with --(conv),--;

col. 8, line 64 replace "(cony)," with --(conv),--.

Signed and Sealed this
Fourteenth Day of May, 2013

Teresa Stanek Rea
*Acting Director of the United States Patent and Trademark Office*